(12) United States Patent
Konishi et al.

(10) Patent No.: US 11,267,162 B2
(45) Date of Patent: Mar. 8, 2022

(54) KNEADING ROTOR AND BATCH-TYPE KNEADING MACHINE

(71) Applicant: KOBE STEEL, LTD., Hyogo (JP)

(72) Inventors: Akira Konishi, Takasago (JP); Yasuaki Yamane, Takasago (JP); Naofumi Kanei, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 3 days.

(21) Appl. No.: 17/045,654

(22) PCT Filed: Mar. 18, 2019

(86) PCT No.: PCT/JP2019/011127
§ 371 (c)(1),
(2) Date: Oct. 6, 2020

(87) PCT Pub. No.: WO2019/198433
PCT Pub. Date: Oct. 17, 2019

(65) Prior Publication Data
US 2021/0154886 A1     May 27, 2021

(30) Foreign Application Priority Data

Apr. 9, 2018     (JP) .............................. JP2018-074448

(51) Int. Cl.
| | |
|---|---|
| *B29B 7/18* | (2006.01) |
| *B29B 7/20* | (2006.01) |
| *B29B 7/74* | (2006.01) |
| *B29B 7/22* | (2006.01) |

(52) U.S. Cl.
CPC ............... *B29B 7/186* (2013.01); *B29B 7/20* (2013.01); *B29B 7/7495* (2013.01); *B29B 7/22* (2013.01)

(58) Field of Classification Search
CPC ......... B29B 7/186; B29B 7/20; B29B 7/7495; B29B 7/22; B29B 7/183; B01F 7/18; B01F 7/24
USPC ........................................................ 366/96–97
See application file for complete search history.

(56) References Cited

U.S. PATENT DOCUMENTS

| | | | | |
|---|---|---|---|---|
| 4,744,668 A | * | 5/1988 | Nortey .................... | B29B 7/186 366/76.7 |
| 4,893,936 A | * | 1/1990 | Borzenski ............... | B29B 7/263 366/76.7 |
| 5,984,516 A | | 11/1999 | Inoue et al. | |
| 6,402,360 B1 | * | 6/2002 | Nortey .................... | B29B 7/183 366/85 |

(Continued)

FOREIGN PATENT DOCUMENTS

| | | | | |
|---|---|---|---|---|
| CA | 2428700 C | * | 12/2006 | ............. B29B 7/186 |
| CA | 2742730 C | * | 12/2014 | ............. B29B 7/246 |

(Continued)

*Primary Examiner* — Charles Cooley
(74) *Attorney, Agent, or Firm* — Studebaker & Brackett PC

(57) ABSTRACT

In kneading rotors, a twist angle of long wing constituting kneading wings is between 38 degrees and 53 degrees inclusive. The long wing includes, between the long wings and an inner surface of a casing, wing tops configured to form, along a wing longitudinal direction, a first tip clearance, and a second tip clearance narrower than the first tip clearance in width. A central angle of the long wing forming the second tip clearance is between 5 degrees and 10 degrees inclusive.

9 Claims, 12 Drawing Sheets

(56) References Cited

U.S. PATENT DOCUMENTS

| | | | | |
|---|---|---|---|---|
| 8,926,166 | B2* | 1/2015 | Yoshida | ............... B29B 7/263 |
| | | | | 366/97 |
| 9,033,570 | B2* | 5/2015 | Tanaka | .................. B29C 48/57 |
| | | | | 366/97 |
| 10,160,140 | B2* | 12/2018 | Kameda | .................. B29B 7/246 |
| 2001/0036123 | A1* | 11/2001 | Koro | ..................... B29B 7/263 |
| | | | | 366/84 |
| 2006/0104154 | A1 | 5/2006 | Inoue et al. | |
| 2011/0222364 | A1* | 9/2011 | Yoshida | ................ B29B 7/246 |
| | | | | 366/98 |
| 2014/0369843 | A1* | 12/2014 | Tanaka | .................. B29B 7/263 |
| | | | | 416/223 R |
| 2016/0200001 | A1* | 7/2016 | Kameda | ................. B29B 7/183 |
| | | | | 366/97 |
| 2017/0173543 | A1 | 6/2017 | Yamaguchi et al. | |
| 2021/0154886 | A1* | 5/2021 | Konishi | ................. B29B 7/186 |

FOREIGN PATENT DOCUMENTS

| | | | | | |
|---|---|---|---|---|---|
| EP | | 0729816 | B1 * | 8/1998 | .......... B29B 7/7495 |
| JP | | 1-307436 | A * | 12/1989 | |
| JP | | 2002-011336 | A | 1/2002 | |
| JP | | 3980841 | B2 * | 9/2007 | ............. B29B 7/186 |
| JP | | 2010162511 | A * | 7/2010 | ............. B29B 7/263 |
| JP | | 2015039789 | A * | 3/2015 | ............. B29B 7/186 |
| WO | WO-02089964 | A1 * | 11/2002 | ............. B29B 7/183 |
| WO | | 2013/115371 | A1 | 8/2013 | |

* cited by examiner

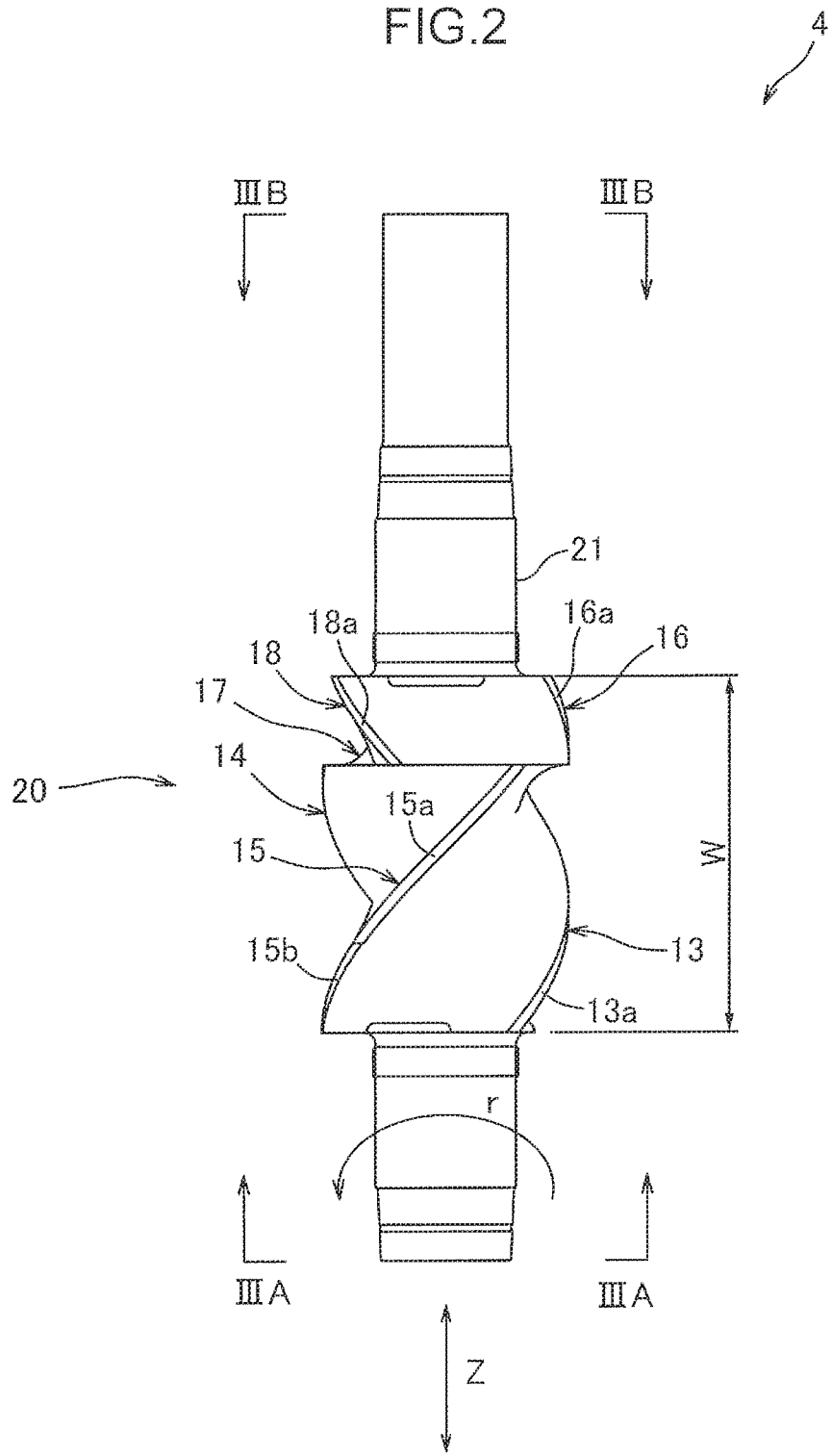

KNEADING ROTOR AND BATCH-TYPE KNEADING MACHINE

TECHNICAL FIELD

The present invention relates to a kneading rotor and a batch-type kneading apparatus.

BACKGROUND ART

A batch-type kneading apparatus is a kneading apparatus that can produce a batch of kneaded product. The kneading apparatus includes a hopper portion into which a polymer material such as rubber or plastic (material to be kneaded) is injected, a kneading room (chamber) into which the material to be kneaded is pressed from inside the hopper portion, and a kneading rotor disposed in the kneading room (chamber). The kneading rotor kneads the material to be kneaded and the kneaded product in a desired kneaded state is discharged to the outside. This produces a batch of kneaded product. The kneading rotor is a main component for kneading the material to be kneaded among components constituting the batch-type kneading apparatus. Conventionally, for example, the technique related to a kneading rotor as described below has been proposed.

Patent Literature 1 proposes a kneading rotor in which a small tip clearance with a ratio of clearance to an inner diameter of a casing in the range of 0.0025 to 0.0250, a medium tip clearance with a ratio in the range of 0.0100 to 0.0500, and a large tip clearance with a ratio in the range of 0.0250 to 0.1000 are formed (see, for example, Patent Literature 1).

According to the kneading rotor disclosed in Patent Literature 1, even if a type of material to be kneaded changes, a shearing force acts reliably on the material to be kneaded, and the material to be kneaded is well kneaded in the kneading room (chamber).

In recent years, demand for fuel-efficient tires has increased. In rubber that is a raw material of fuel-efficient tires, silica is often blended in a high proportion. The rubber in which silica is blended in a high proportion (material to be kneaded) has the property that the silica in the rubber tends to become so-called "lump of silica" and is hardly dispersed. Therefore, further improvement in material kneading performance of a kneading rotor is desired.
Patent Literature 1: Japanese Patent No. 4024976

SUMMARY OF INVENTION

An object of the present invention is to provide a kneading rotor that can improve kneading performance of a material to be kneaded and can increase productivity of a kneaded product.

A kneading rotor according to one aspect of the present invention is a kneading rotor rotatably disposed in a casing of a batch-type kneading apparatus. The kneading rotor includes: a rotor shaft; and kneading wings configured to rotate integrally with the rotor shaft to apply a shearing force to a material to be kneaded by passing the material to be kneaded through a clearance between the kneading wings and an inner surface of the casing. The kneading wings include: long wings extending from a first end side of a rotor axial direction; and short wings extending from a second end side of the rotor axial direction. Each of the long wings is disposed in a range longer than half of a length of a range, in the rotor axial direction, in which the kneading wings are disposed, and each of the long wings is twisted in a direction of flowing the material to be kneaded toward the second end side of the rotor axial direction when the rotor shaft rotates. Each of the short wings is disposed in a range shorter than half of the length of the range, in the rotor axial direction, in which the kneading wings are disposed, and each of the short wings is twisted in a direction of flowing the material to be kneaded toward the first end side of the rotor axial direction when the rotor shaft rotates. A twist angle of each of the long wings is between 38 degrees and 53 degrees inclusive. Each of the long wings includes, between each of the long wings and the inner surface of the casing, a wing top configured to form, along a wing longitudinal direction, a first tip clearance, and a second tip clearance narrower than the first tip clearance in width. A central angle around a rotor axis defining a width of the wing top forming the second tip clearance is between 5 degrees and 10 degrees inclusive.

BRIEF DESCRIPTION OF DRAWINGS

FIG. 2 is a plan view of the kneading rotor shown in FIG. 1;

DESCRIPTION OF EMBODIMENT

Figure 1:
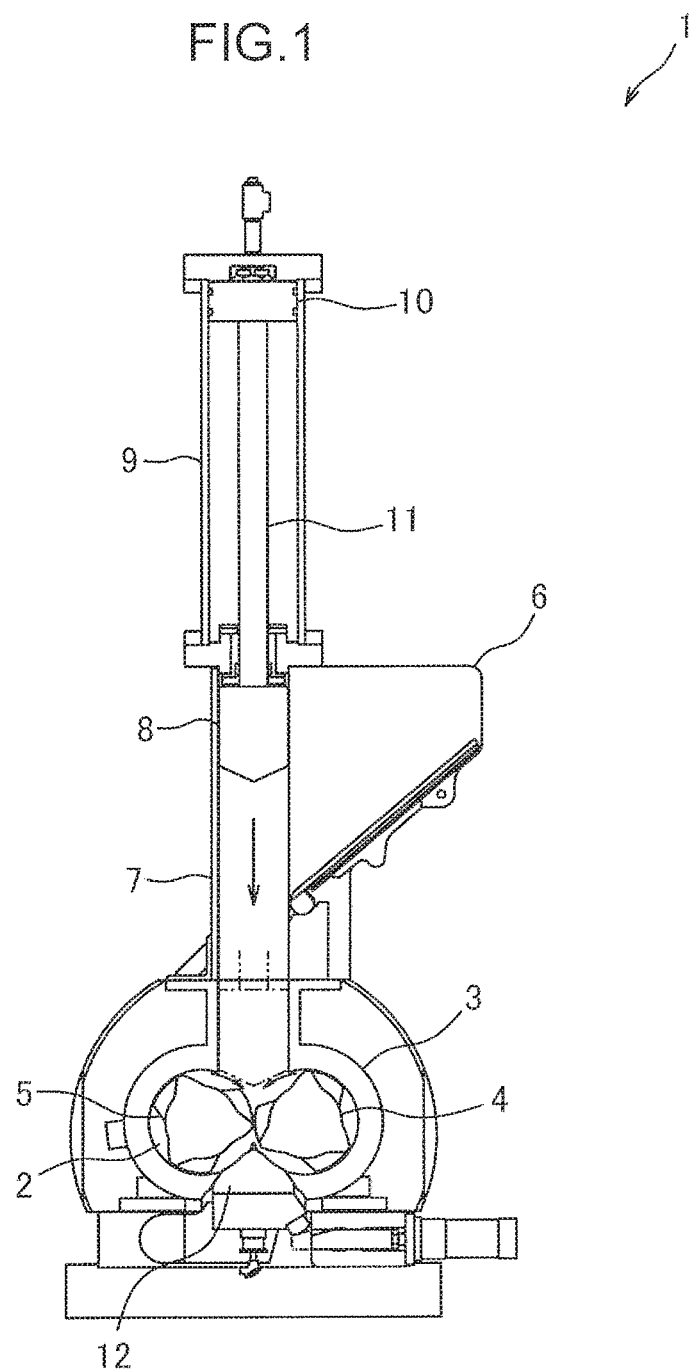
FIG. 1 is a front cross-sectional view of a batch-type kneading apparatus including kneading rotors according to an embodiment.

An embodiment will be described below with reference to the drawings. Note that the following embodiment is one example of embodying the present invention, and does not limit the technical scope of the present invention. FIG. 1 is a front cross-sectional view of a batch-type kneading apparatus 1 including kneading rotors 4 and 5 according to the embodiment. The batch-type kneading apparatus 1 is also called an enclosed kneading apparatus. The batch-type kneading apparatus 1 is used for kneading polymer materials such as plastic and rubber.

(Configuration of Batch-Type Kneading Apparatus)

First, the configuration of the batch-type kneading apparatus 1 will be described with reference to FIG. 1. As shown in FIG. 1, the batch-type kneading apparatus 1 includes a casing 3 including a kneading room (chamber) 2, one pair of right and left kneading rotors 4 and 5 rotatably disposed in the kneading room (chamber) 2, a material supply tube 7 erected on an upper portion of the casing 3, and a floating weight 8 disposed in the material supply tube 7 in a vertically movable manner. The vertical cross section of the kneading room (chamber) 2 has a shape of two overlapping circles. An opening is formed in an upper portion of the casing 3, and inner space of the material supply tube 7 communicates with the kneading room (chamber) 2 through the opening. A hopper 6 is attached to the material supply tube 7.

A pneumatic cylinder 9 is connected to an upper portion of the material supply tube 7. A piston 10 in the pneumatic cylinder 9 is connected to the floating weight 8 via a piston rod 11 that passes airtightly through a lower lid of the pneumatic cylinder 9. When an upper portion of the pneumatic cylinder 9 is pressurized and the floating weight 8 is lowered, the material to be kneaded in the material supply tube 7 supplied from the hopper 6 is pushed into the kneading room (chamber) 3 of the casing 3. An outlet formed at the bottom of the casing 3 is closed by a drop door 12 that can be opened and closed by a rotary actuator. When the drop door 12 is opened, the kneaded product kneaded for a predetermined time in the kneading room (chamber) 2 (material that has already been kneaded) is discharged from the kneading room (chamber) 2. Note that the batch-type kneading apparatus 1 of the present embodiment is a non-intermeshing kneading apparatus having one pair of right and left kneading rotors 4 and 5 that do not mesh with each other. Instead of the pneumatic cylinder 9, a hydraulic cylinder may be used.

(Kneading Rotor)

Figure 3A:
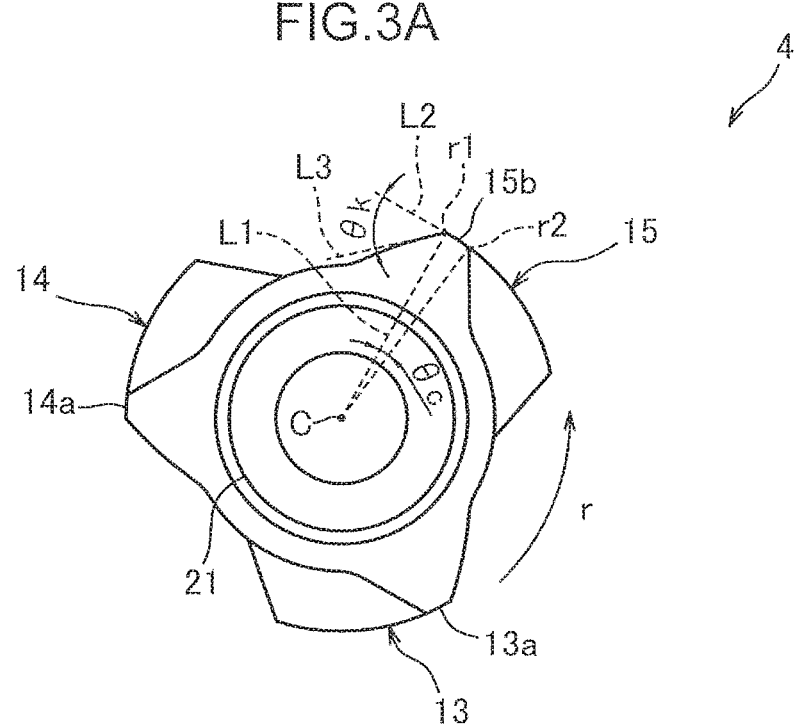
FIG. 3A is a view along arrows IIIA-IIIA of FIG. 2.
Figure 3B:
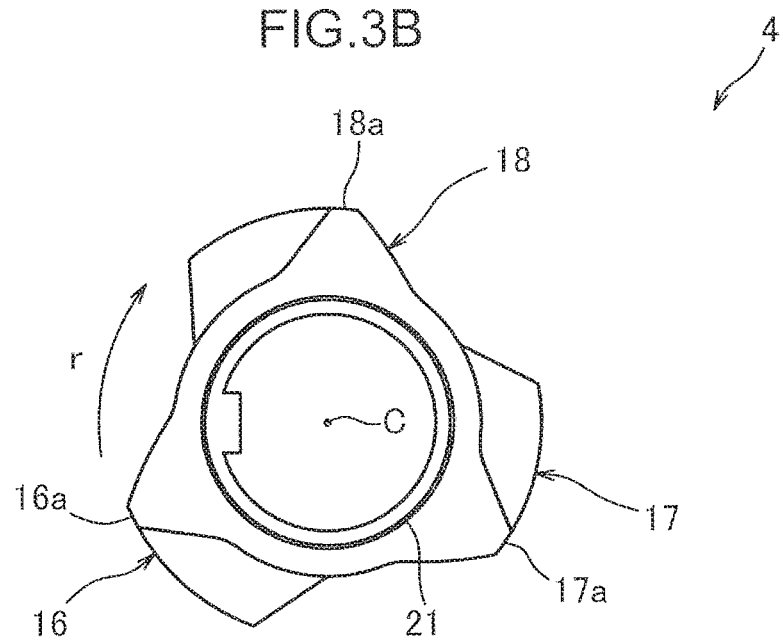
FIG. 3B is a view along arrows IIIB-IIIB of FIG. 2.
Figure 4:
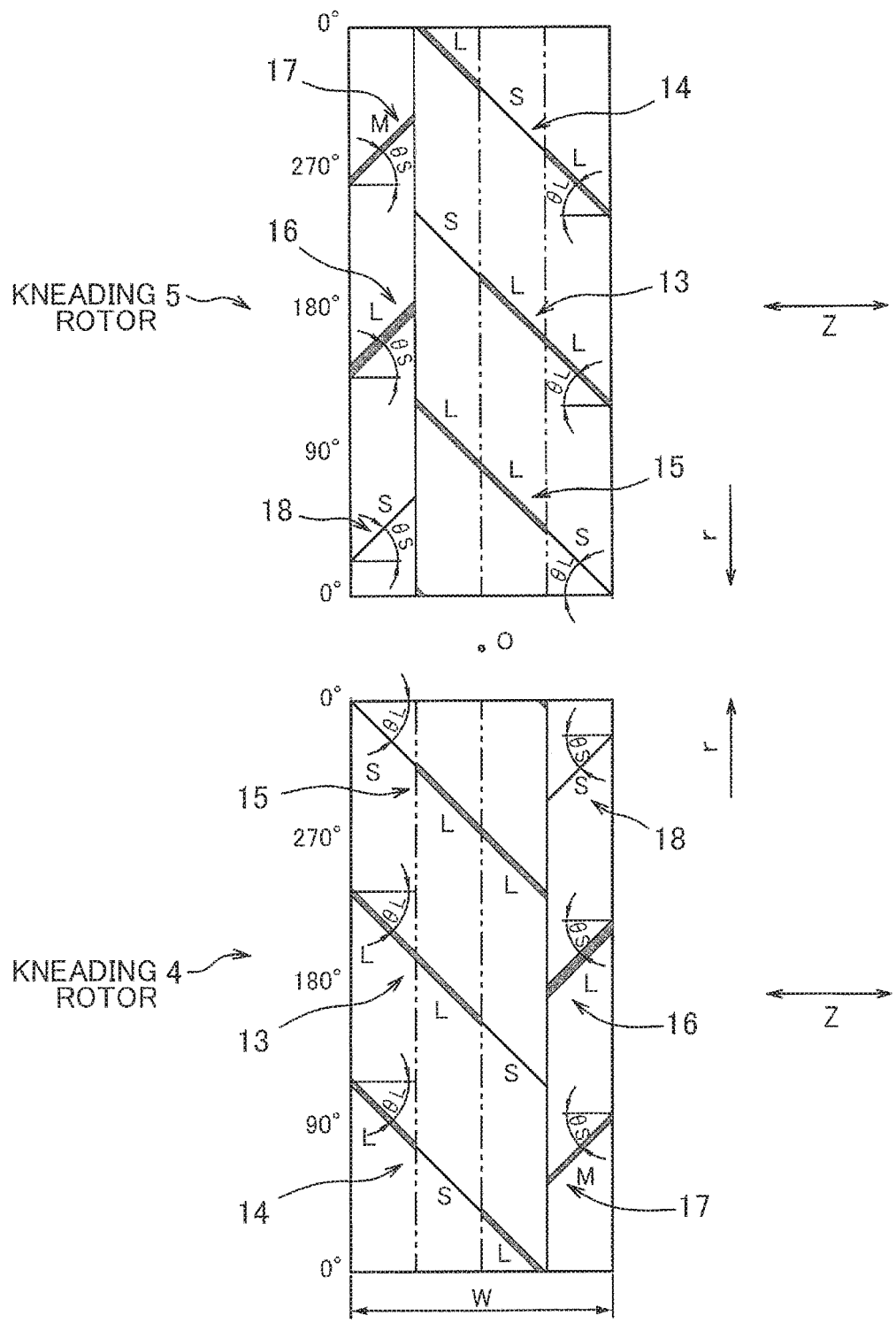
FIG. 4 is a developed diagram of a body portion of the kneading rotor shown in FIG. 1 around an axis.
Figure 5:
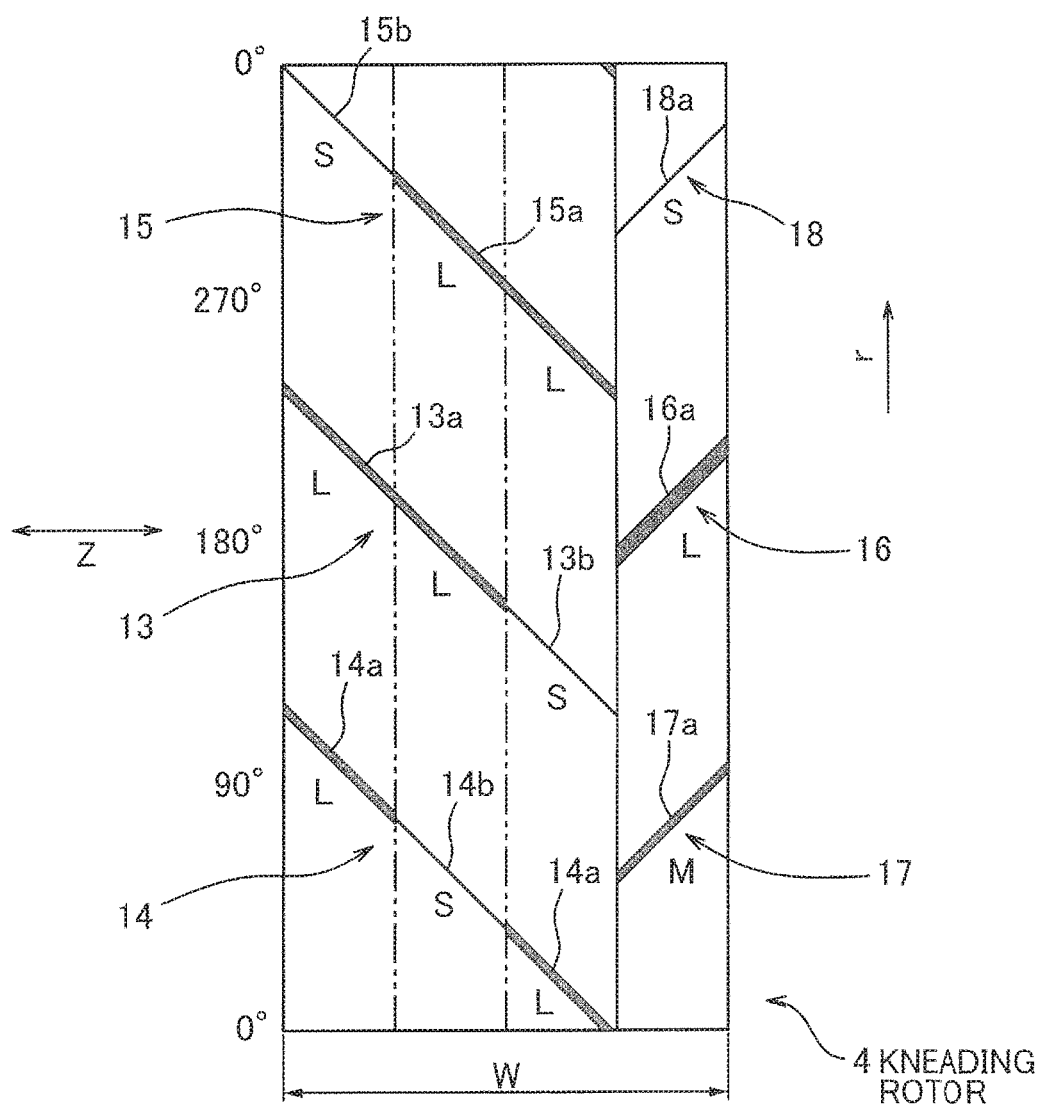
FIG. 5 is an enlarged diagram of the developed diagram of the body portion of the kneading rotor shown in FIG. 4.

FIG. 2 is a plan view of the kneading rotor 4 shown in FIG. 1. FIGS. 3A and 3B are a view along arrows IIIA-IIIA depicted in FIG. 2 and a view along arrows IIIB-IIIB depicted in FIG. 2, respectively. FIG. 4 is a developed diagram of body portions 20 of the kneading rotors 4 and 5 shown in FIG. 1 around an axis. FIG. 5 is an enlarged diagram of the developed diagram of the body portion 20 of the kneading rotor 4 shown in FIG. 4 around an axis.

The kneading rotors 4 and 5 are disposed in the kneading room (chamber) 2 while being adjacent to each other so as to be parallel to each other. The kneading rotors 4 and 5 rotate in directions opposite to each other. For example, the kneading rotors 4 and 5 are set to rotate such that rotor inside portions facing each other move downward. Each of the kneading rotors 4 and 5 includes a rotor shaft 21 having a shape extending in one direction and the body portion 20 positioned in an intermediate portion of an axial direction of the rotor shaft 21. The kneading rotors 4 and 5 are rotatably supported by bearings (not shown) at both sides of the body portions 20 in both of the rotor shafts 21.

In each body portion 20, a plurality of kneading wings 13 to 18 are disposed around an axis C of the rotor shaft 21. That is, the body portion 20 is a portion where the plurality of kneading wings 13 to 18 are formed on an outer peripheral surface. When rotating around the axis C, the kneading wings 13 to 18 pass the material to be kneaded through clearances between an inner surface of the casing 3 (inner wall surface forming the kneading room (chamber) 2)) and the kneading wings 13 to 18 (tip clearances) to give a shearing force to the material. The kneading wings 13 to 18 are spirally formed around the rotor axis C extending along a central axis of the rotor shaft 21. Since the kneading wings 13 to 18 are twisted around the rotor axis C, the material to be kneaded is pushed in a rotor axial direction Z. Therefore, when the kneading rotors 4 and 5 rotate, a flow of the material to be kneaded occurs in the axial direction. Note that the tip clearances refer to clearances between wing tops (tip portions) 13a to 18a forming radial outer end surfaces (front end surfaces) of the kneading wings 13 to 18 and the inner surface of the casing 3. Note that if a height of the tip portion differs in a circumferential direction, the clearance of the narrowest portion is called tip clearance.

FIG. 4 is a diagram in which the kneading rotors 4 and 5 are developed around the axis C. As can be seen from FIG. 4, each of the kneading wings 13 to 18 of the kneading rotor 4 and each of the kneading wings 13 to 18 of the kneading rotor 5 are disposed so as to be point symmetrical with respect to a center point O in a state of being developed in the circumferential direction. In other words, two kneading rotors having the same shape are installed in directions opposite to each other. Specifically, the twist direction of the kneading wings 13 to 18 in the kneading rotor 4 is the same as the twist direction of the kneading wings 13 to 18 in the kneading rotor 5. Meanwhile, in the kneading rotors 4 and 5, long wings 13 to 15 and short wings 16 to 18 to be described later are disposed in the kneading room (chamber) 2 in a positional relationship opposite to each other in the rotor axial direction Z. In the following description, the kneading rotor 4 will be described as a representative.

As shown in FIGS. 2 and 4, the kneading rotor 4 of the present embodiment includes six kneading wings 13 to 18. The six kneading wings 13 to 18 include three long wings 13 to 15 and three short wings 16 to 18. The long wings 13 to 15 are all disposed from a first end to the intermediate portion of the rotor axial direction Z in the body portion 20. The short wings 16 to 18 are all disposed from a second end to the intermediate portion of the rotor axial direction Z in the body portion 20. When the kneading rotor 4 is developed to a flat state around the axis C, a developed shape from a start point to an end point of the long wings 13 to 15 extends from a first end side of the rotor axial direction Z toward a second end side of the rotor axial direction Z. Meanwhile, the short wings 16 to 18 extend from the second end side of the rotor axial direction Z toward the first end side of the rotor axial direction Z. That is, when the kneading rotor 4 rotates in one direction, the short wings 16 to 18 are twisted so that the short wings move toward the first end in the rotor axial direction Z, whereas the long wings 13 to 15 are twisted so that the long wings move toward the second end in the rotor axial direction Z.

The long wings 13 to 15 are disposed in a range longer than half of the length (wing length) W of the range where the kneading wings 13 to 18 are disposed in the rotor axial direction Z. The long wings 13 to 15 are twisted at an angle of twist angle θL in a direction of flowing the material to be kneaded toward the second end side of the rotor axial direction Z. Note that the twist angle θL is an inclination angle with respect to the rotor axial direction Z. The short wings 16 to 18 are disposed in a range shorter than half of the wing length W. The short wings 16 to 18 are twisted at an angle of twist angle θS in a direction to flow the material to be kneaded toward the first end side of the rotor axial direction Z. In the present embodiment, the length of the long wings 13 to 15 in the rotor axial direction Z is 0.75 times the wing length W, and the length of the short wings 16 to 18 in the rotor axial direction 2 is 0.25 times the wing length W. That is, a length ratio of the long wings to the short wings (long wings/short wings) is 3.

The long wings 13 to 15 all have two stages of different heights in the wing longitudinal direction. That is, the wing tops (front end surfaces) of the long wings 13 to 15 include low tip portions 13a to 15a and high tip portions 13b to 15b positioned radially outside the low tip portions 13a to 15a, respectively. That is, the long wings 13 to 15 include first portions where the outer end surfaces are low tip portions 13a to 15a, and second portions larger than the first portions in diameter where the outer end surfaces are high tip portions 13b to 15b. The first portions and the second portions are continuous to each other in the wing longitudinal direction. The tip clearances formed between the inner surface of the casing 3 and the low tip portions 13a to 15a are referred to as first tip clearances L, whereas the tip clearances formed between the inner surface of the casing 3 and the high tip portions 13b to 15b are referred to as second tip clearances S. The second tip clearances S are narrower than the first tip clearances in radial width. The long wings 13 to 15 are formed such that two stages of different tip clearances appear along the wing longitudinal direction.

The twist angle θL of the long wings 13 to 15 is between 38 degrees and 53 degrees inclusive. Since the twist angle θL is set between 38 degrees and 53 degrees inclusive, a CV value improves by 20% or more as compared with a case where the twist angle θL is 35 degrees. Details of this point will be described later. The twist angle θL of the long wings may be between 40 degrees and 50 degrees inclusive. By setting the twist angle θL between 40 degrees and 50 degrees inclusive, the CV value improves by 30% or more. Details of this point will also be described later.

A ratio of the first tip clearances L of the long wings 13 to 15 (tip clearances at the low tip portions 13a to 15a) to the inner diameter of the casing 3 may be within a range of 0.02 to 0.07. In this case, further improvement in the CV value will be described later. A ratio of the first tip clearances L of the long wings 13 to 15 (tip clearances at the low tip portions 13a to 15a) to the inner diameter of the casing 3 may be within a range of 0.03 to 0.06.

A central angle θc of the high tip portions 13b to 15b forming the second tip clearances S to the inner surface of the casing 3 may be between 5 degrees and 10 degrees inclusive. Since the central angle θc of the high tip portions 13b to 15b of the long wings 13 to 15 is set between 5 degrees and 10 degrees inclusive, productivity of the kneaded product can be increased. Details of this point will be described later.

An influence of heights of the wing tops (tip clearances), the central angles, the twist angles θS, and the like of the short wings 16 to 18 on the kneading of the material to be kneaded is smaller than an influence of the long wings 13 to 15. Therefore, the heights of the wing tops of the short wings 16 to 18 are not particularly limited.

In the present embodiment, the heights of the short wings 16 to 18 are different from one another. That is, the short wing 18 has the high tip portion 18a, the short wing 17 has a medium tip portion 17a, the short wing 16 has the low tip portion 16a, and the short wings 16 to 18 have tip heights different from one another. That is, the short wings 16 to 18 have three stages of height in total. Note that the short wings 16 to 18 each have a constant height along the wing longitudinal direction. In this regard, the short wings 16 to 18 are different from the long wings 13 to 15 each having two stages of height.

The high tip portion 18a forms the second tip clearance S to the inner surface of the casing 3. The medium tip portion 17a forms a third tip clearance M to the inner surface of the casing 3. The low tip portion 16a forms the first tip clearance L to the inner surface of the casing 3. Note that there is a relationship of second tip clearance S<third tip clearance M<first tip clearance L. There is no particular relationship between sizes of the tip clearances S and L in the long wings 13 to 15 and sizes of the tip clearances S and L in the short wings 18 and 16.

If the sizes of the second tip clearances S appeared by the long wings 13 to 15 and the short wing 18 are too small, there is a possibility that the tip portions (wing tops) interfere with the inner surface of the casing 3, the floating weight 8, the drop door 12, or the like. Therefore, the long wings 13 to 15 and the short wing 18 may be formed such that the second tip clearances S (the smallest tip clearance) are 3.2 mm or more.

(Improvement in Kneading Performance of Material to be Kneaded, and Improvement in Productivity of Kneaded Product)

The inventors of the present invention have eagerly studied the kneading rotor capable of improving kneading performance of the material to be kneaded (material dispersibility) and increasing productivity of the kneaded product. This will be described below. This study mainly compares the kneading rotor having three long wings and three short wings, and in which the tip clearance of the long wings changes in three stages as disclosed in Japanese Patent No. 4024976.

An index of kneading performance of the material to be kneaded includes the CV value. As this CV value decreases, the kneading performance of the material to be kneaded improves. In addition, the productivity of the kneaded product is affected by energy given to the material to be kneaded (kneading energy) and space volume of the kneading room (chamber) 2. It is possible to increase the productivity of the kneaded product by increasing the energy given to the material to be kneaded (kneading energy) and increasing the space volume of the kneading room (chamber) 2. Note that the space volume of the kneading room (chamber) 2 mentioned here refers to empty volume of the kneading room (chamber) 2 with the kneading rotors 4 and 5 disposed in the kneading room (chamber) 2 (in the casing 3).

Factors affecting the performance of the kneading rotor include a wing length ratio of the kneading rotor (ratio of the long wing length to the short wing length), biting angle, central angle, twist angle of the long wing, twist angle of the short wing, and tip clearance. The inventors of the present invention have eagerly studied which factor stably and greatly affects the performance of the kneading rotor by a method such as flow analysis by changing such various factors.

The biting angle refers to, for example, as shown in FIG. 3A, an angle (θk (0 degrees<θk<90 degrees)) formed by a straight line L2 and a tangential line L3 of the kneading wing. The straight line L2 is perpendicular to a straight line L1 connecting an end point r1 of a rotation direction r in the front end surface of the kneading wings 13, 14, 15 (tip portion 15b or wing top) and the rotor axis C. The tangential line L3 passes through the end point r1 of the rotation direction r on the front end surface. The central angle θc refers to an angle around the rotor axis C that defines the widths of the front end surface of the kneading wings 13, 14, and 15. For example, as shown in FIG. 3A, the central angle θc is represented as an angle (θc (0 degrees<θc<180 degrees)) formed by two straight lines connecting the both end points r1 and r2 of the rotation direction r in the front end surface of the kneading wing (tip portion 15b or wing top) and the rotor axis C.

As a result of the eager study, the inventors of the present invention have found that although there are many factors that affect the performance of the kneading rotor as described above, specified factors greatly affect the kneading performance of the material to be kneaded or the productivity of the kneaded product. Specifically, the CV value, which is an index of the kneading performance of the material to be kneaded, is stably and greatly affected by the twist angle of the long wing and the large tip clearance (the first tip clearance). The productivity of the kneaded product is stably and greatly affected by the central angle of the high tip portion that causes the small tip clearance (the second tip clearance) to appear in the long wing (for example, the tip portion 15b shown in FIGS. 3A and 5).

Figure 6:
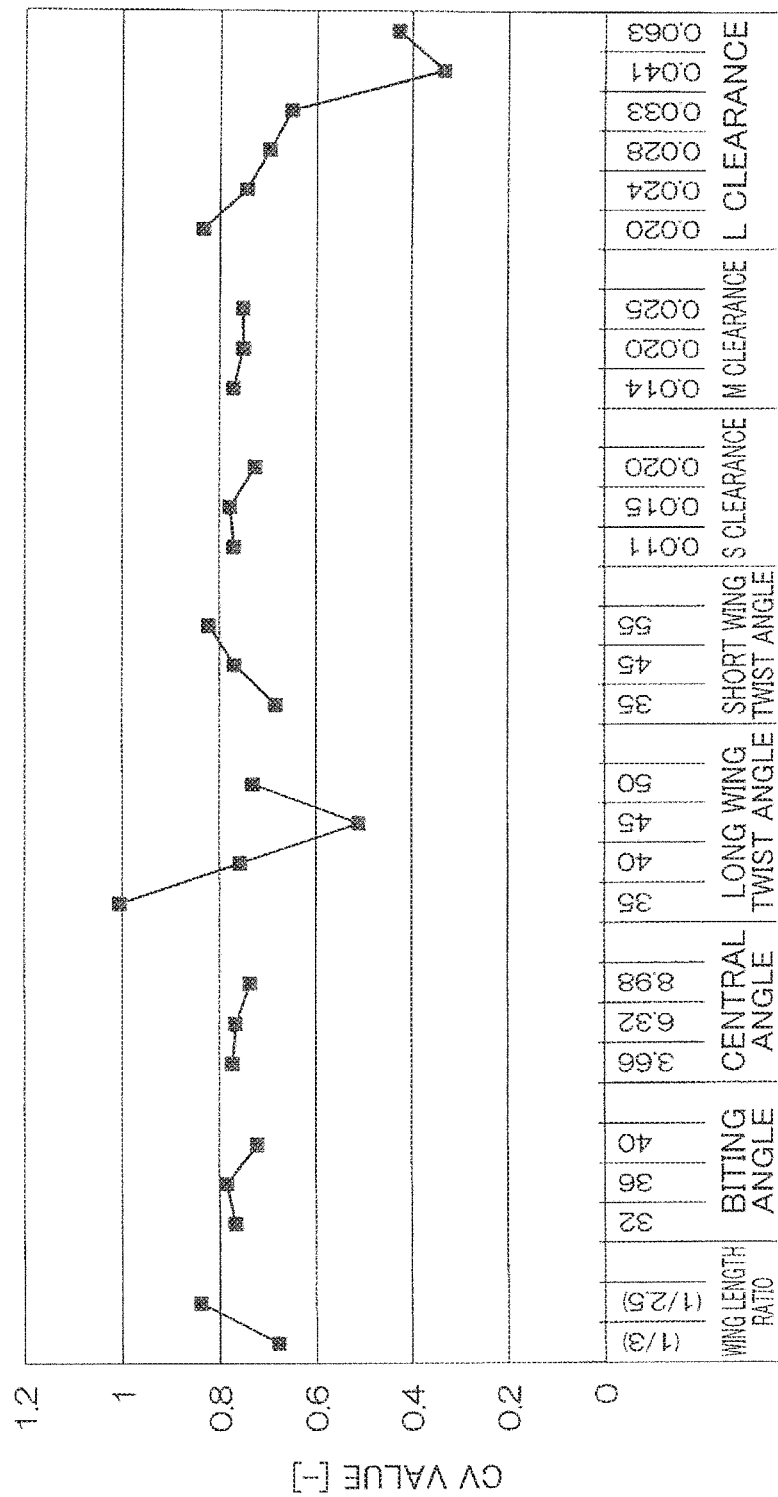
FIG. 6 is a graph of factorial effects regarding a CV value when the kneading rotor makes 10 revolutions.
Figure 7:
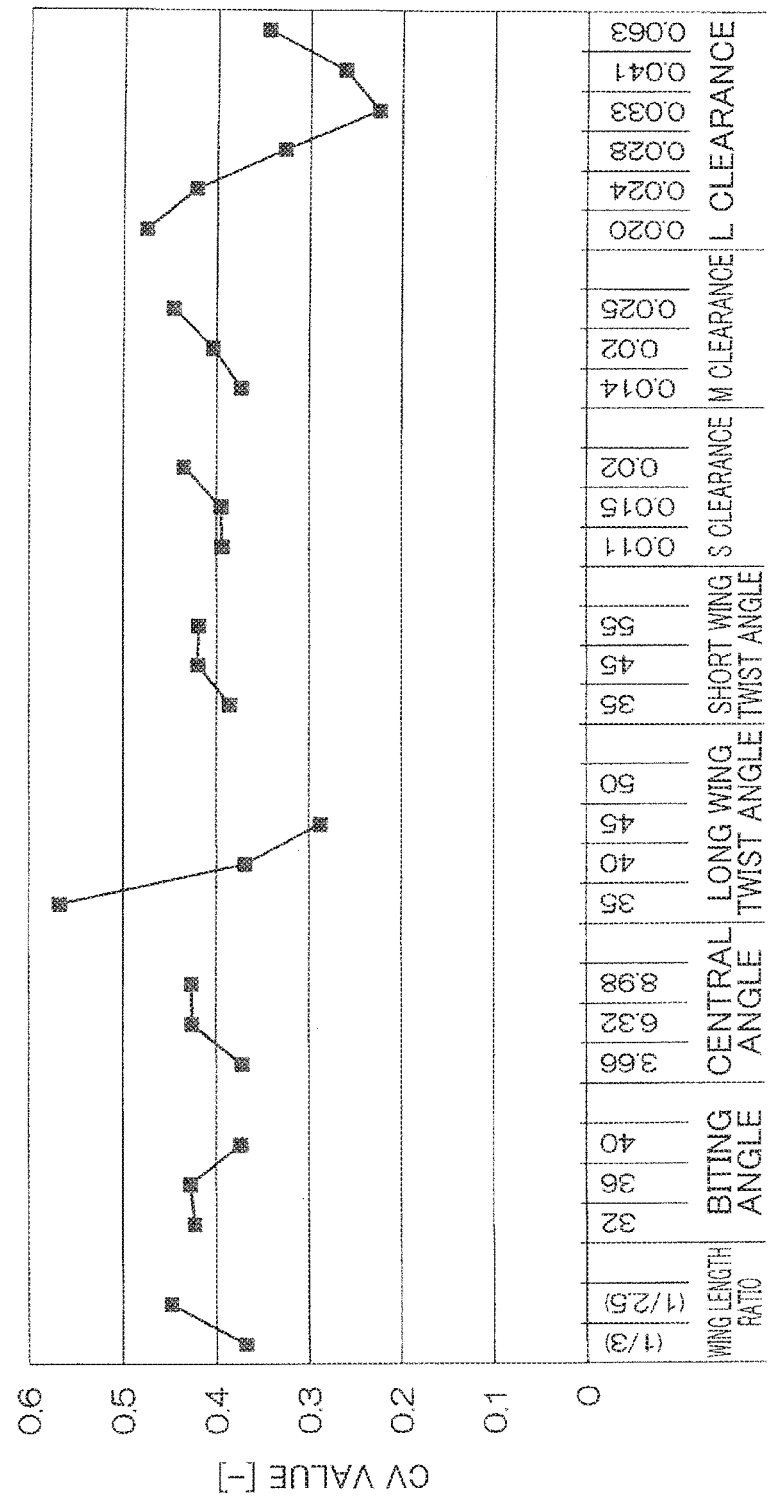
FIG. 7 is a graph of factorial effects regarding the CV value when the kneading rotor makes 16 revolutions.

FIG. 6 is a graph of factorial effects regarding the CV value when the kneading rotor makes 10 revolutions. FIG. 7 is a graph of factorial effects regarding the CV value when the kneading rotor makes 16 revolutions. The S clearance, M clearance, and L clearance described in FIGS. 6 and 7 are the clearances formed by the long wings, and refer to the second tip clearance S with a small clearance, the third tip clearance M with a medium clearance, and the first tip clearance L with a large clearance, respectively. Numerical values described in each clearance column are a ratio of the clearance to the inner diameter of the casing 3.

FIGS. 6 and 7 show that the CV value greatly changes in a case where the twist angle of the long wing differs and a case where the first tip clearance L of the long wing differs. That is, FIGS. 6 and 7 show that the CV value is stably and greatly affected by the twist angle of the long wing and the first tip clearance L.

Since the CV value (kneading performance of the material to be kneaded) is stably and greatly affected by the twist angle of the long wing, the inventors of the present invention have investigated a relationship between the twist angle of the long wing and the CV value. A result of the investigation is shown in FIG. 9.

Figure 9:
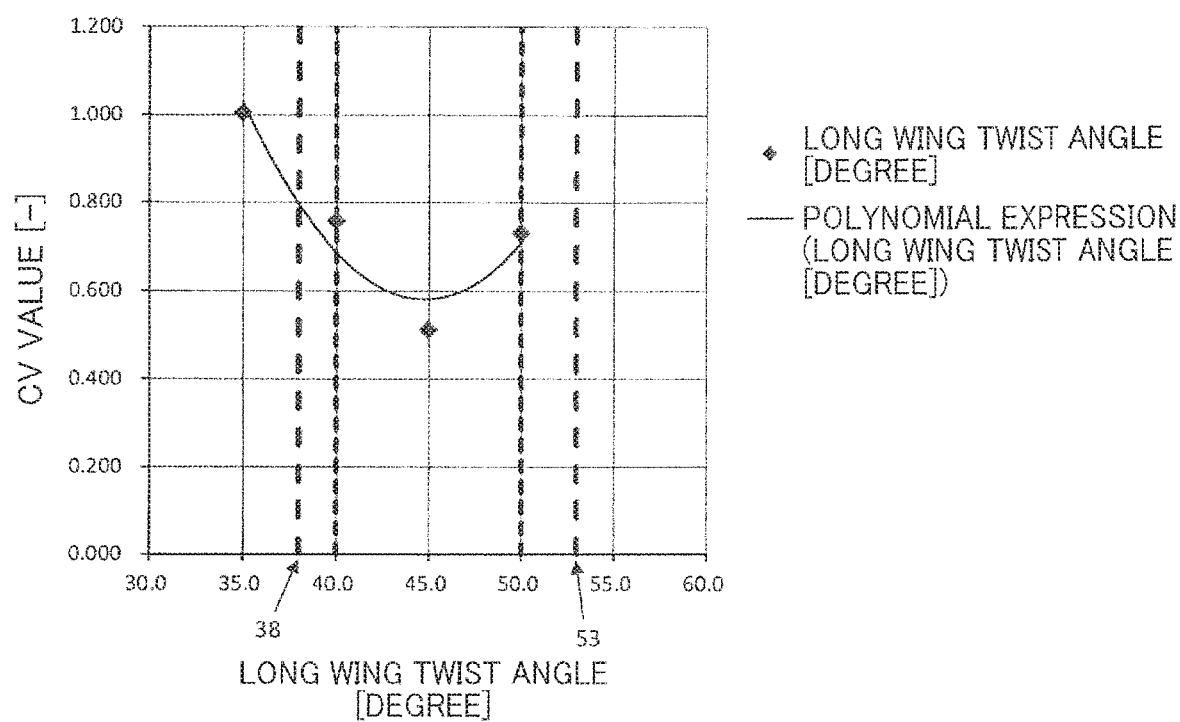
FIG. 9 is a diagram showing a relationship between a twist angle of a long wing and the CV value.

As shown in FIG. 9, the twist angle θL of the long wing (for example, the long wings 13 to 15 shown in FIGS. 2 to 5) is preferably between 38 degrees and 53 degrees inclusive. Since the twist angle θL is set between 38 degrees and 53 degrees inclusive, the CV value improves by 20% or more as compared with a case where the twist angle θL is 35 degrees. Note that the twist angle θL of the long wing may be between 40 degrees and 50 degrees inclusive. When the twist angle θL is set between 40 degrees and 50 degrees inclusive, the CV value improves by 30% or more. Note that as the twist angle θL increases, the CV value turns from decreasing to increasing when θL exceeds around 45 degrees. This is because the feedability of the material to be kneaded weakens when the twist angle θL exceeds 45 degrees. That is, when the twist angle θL becomes excessive, the push in a direction parallel to the axial direction relatively weakens. In addition to the fact that the factor that stably and greatly affects the CV value, which is the index of the kneading performance of the material to be kneaded, is the twist angle of the long wing, it can be seen that there is a suitable range of the twist angle.

In addition to the twist angle of the long wing, the first tip clearance of the long wing also affects the CV value stably and greatly. Therefore, the inventors of the present invention have investigated a relationship between the first tip clearance of the long wing and the CV value as well. A result of the investigation is shown in FIG. 10.

Figure 10:
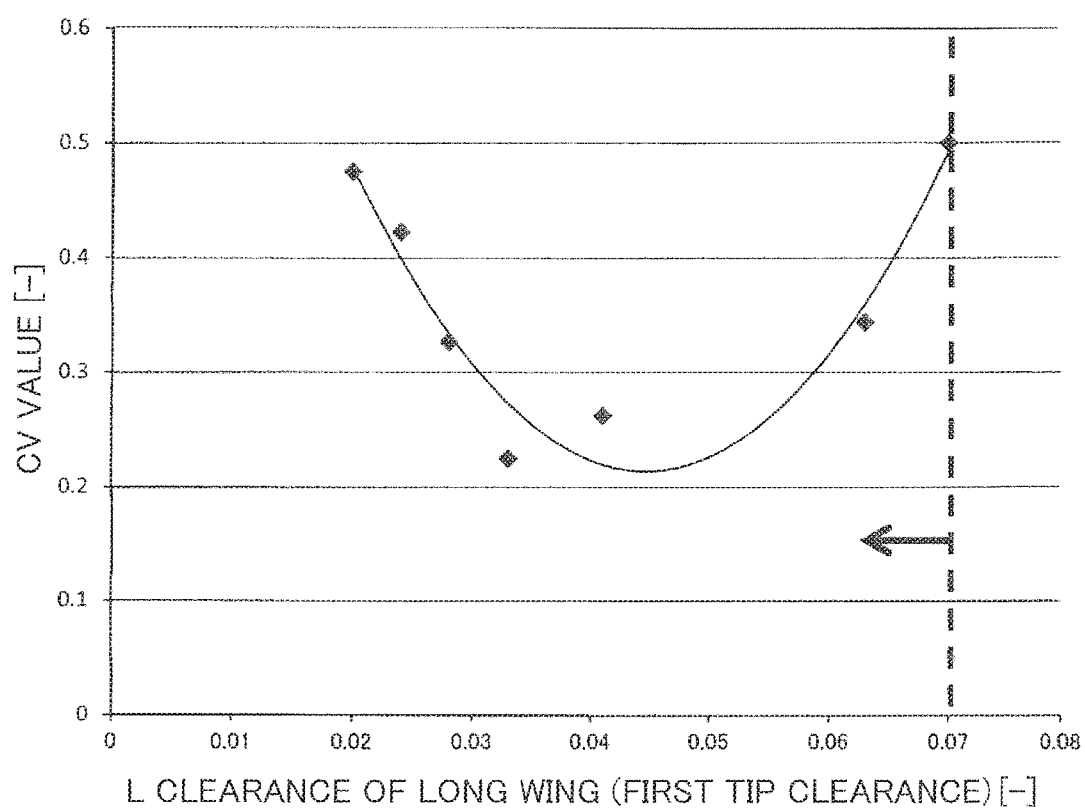
FIG. 10 is a diagram showing a relationship between a large tip clearance of the long wing and the CV value.

As shown in FIG. 10, the ratio of the first tip clearance L of the long wing (for example, the long wings 13 to 15 shown in FIGS. 2 to 5) to the inner diameter of the casing 3 is preferably 0.07 or less. Note that the lower limit of the first tip clearance L is about 0.02 in terms of the ratio to the inner diameter of the casing 3. That is, the ratio of the first tip clearance L of the long wings to the inner diameter of the casing 3 is preferably in the range of 0.02 to 0.07. The ratio of the first tip clearance L of the long wings to the inner diameter of the casing 3 may be in the range of 0.03 to 0.06.

In this case, the CV value is higher by about 40% as compared with a case where the ratio is 0.02.

Figure 8:
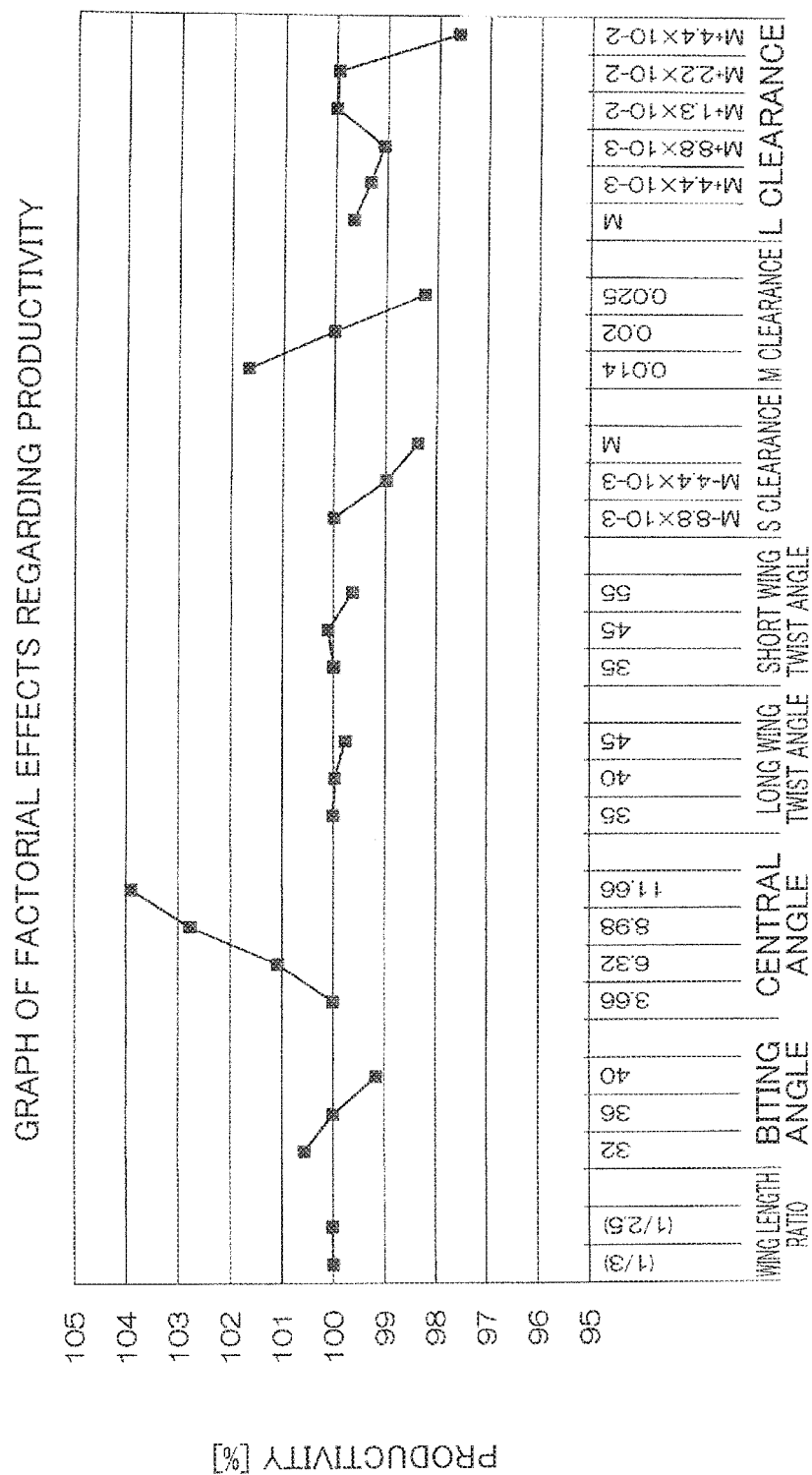
FIG. 8 is a graph of factorial effects regarding productivity.

FIG. 8 is a graph of factorial effects regarding productivity. In FIG. 8, the productivity (%) of the kneaded product, which is the product of the kneading energy and the space volume of the kneading room 2, is plotted on a vertical axis. The central angle described in FIG. 8 is the central angle of the high tip portion of the long wings. The S clearance, M clearance, and L clearance described in FIG. 8 are the clearances formed by the long wings, and refer to the second tip clearance with a small clearance, the third tip clearance with a medium clearance, and the first tip clearance with a large clearance, respectively. Numerical values described in the column of M clearance represent the ratio of the clearance to the inner diameter of the casing 3. For example, "M−8.8×10$^{-3}$" described in the column of S clearance is the tip clearance indicated with a difference from the corresponding M clearance (M=0.014). The same applies to the column of L clearance.

FIG. 8 shows that the productivity of the kneaded product greatly changes when the central angle of the high tip portion of the long wings is changed. That is, FIG. 8 shows that the productivity of the kneaded product is stably and greatly affected by the central angle of the high tip portion of the long wings.

Figure 11:
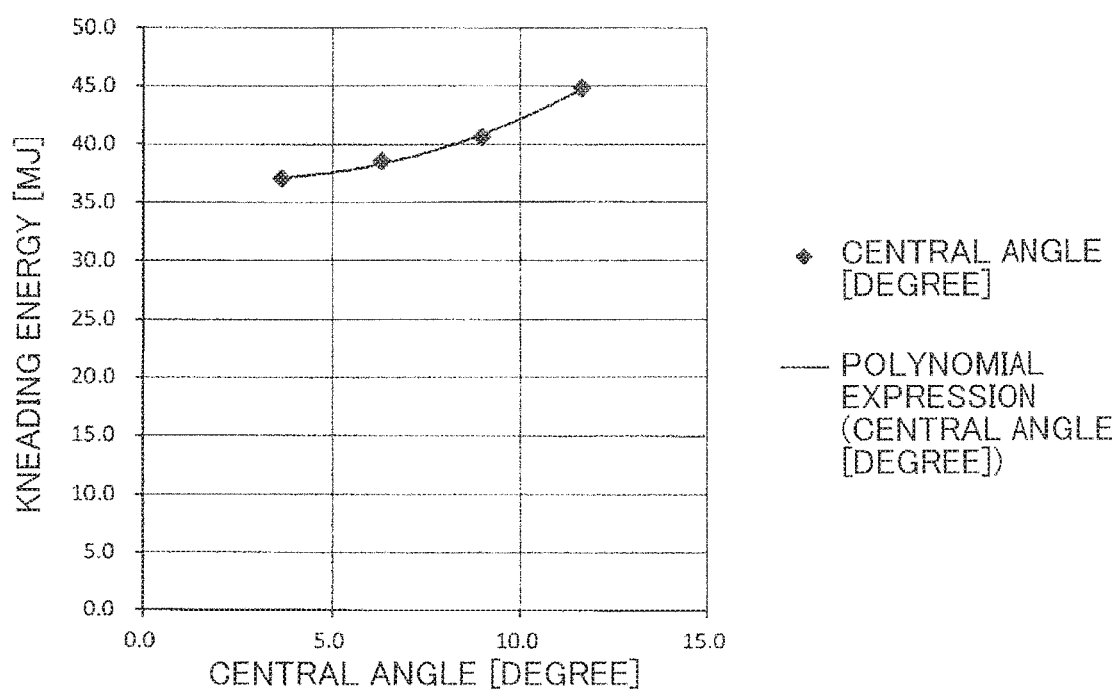
FIG. 11 is a diagram showing a relationship between a central angle of a high tip portion of the long wing and kneading energy.

The productivity of the kneaded product, which is the product of the kneading energy and the space volume of the kneading room 2, is stably and greatly affected by the central angle of the high tip portion of the long wings. Therefore, the inventors of the present invention have investigated the relationship between the central angle of the high tip portion of the long wings and the kneading energy. A result of the investigation is shown in FIG. 11. As shown in FIG. 11, the kneading energy increases as the central angle of the high tip portion of the long wings increases.

Figure 12:
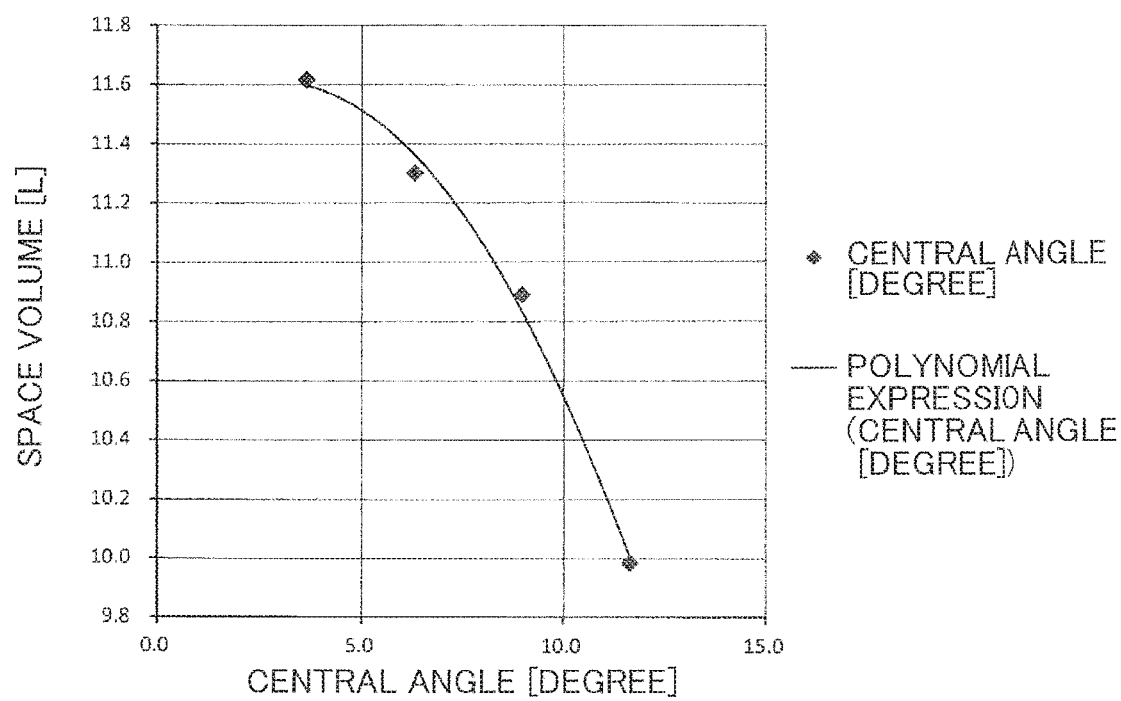
FIG. 12 is a diagram showing a relationship between the central angle of the high tip portion of the long wing and space volume of a kneading room (chamber).

FIG. 12 shows a relationship between the central angle of the high tip portion of the long wings and the space volume (empty volume) of the kneading room (chamber) 2. As shown in FIG. 12, as the central angle of the high tip portion of the long wings increases, the space volume of the kneading room (chamber) 2 decreases. As the space volume of the kneading room (chamber) 2 decreases, the throughput per batch decreases. Therefore, as the central angle of the high tip portion of the long wings increases, the throughput of the material to be kneaded decreases. That is, the central angle of the high tip portion of the long wings is not necessarily required to be large, and needs to be determined in relation to the kneading energy and the space volume of the kneading room 2. As a result of the eager study, the inventors of the present invention have found that when the central angle of the high tip portion of the long wings (for example, θc shown in FIG. 3A) is between 5 degrees and 10 degrees inclusive, the productivity of the kneaded product can be further increased as compared with the kneading rotor having six kneading wings as described in Japanese Patent No. 4024976.

The embodiment has been described above. Note that various modifications can be made within the scope those skilled in the art can assume.

For example, although the above embodiment has illustrated a non-intermeshing (tangential) kneading rotor (kneading apparatus), the present invention can also be applied to a uniaxial kneading rotor (kneading apparatus).

(Modification)

In the embodiment shown in FIGS. 4 and 5, in the long wings 13 to 15, the length of the rotor axial direction Z in the low tip portions 13a to 15a forming the first tip clearance L is set at 0.5 times the length (wing length) W of the range in which the kneading wings 13 to 18 are disposed, and the length of the rotor axial direction Z of the high tip portions 13b to 15b is set at 0.25 times the wing length W. That is, in the rotor axial direction Z, the low tip portions 13a to 15a are longer than the high tip portions 13b to 15b. Alternatively, the low tip portions 13a to 15a may be shorter than the high tip portions 13b to 15b in the rotor axial direction Z, for example, the length of the rotor axial direction Z of the low tip portions 13a to 15a of the long wings 13 to 15 is 0.25 W, and the length of the rotor axial direction Z of the high tip portions 13b to 15b is 0.5 W. Also, in the rotor axial direction Z, the length of the low tip portions 13a to 15a may be the same as the length of the high tip portions 13b to 15b.

In the long wings 13 to 15, the tip clearance formed by the long wings 13 to 15 is formed in two stages, respectively, but the invention is not limited to this example. For example, the tip clearance may be formed in three or more stages.

Here, the embodiment will be outlined.

(1) The above embodiment is a kneading rotor rotatably disposed in a casing of a batch-type kneading apparatus. The kneading rotor includes: a rotor shaft; and kneading wings configured to rotate integrally with the rotor shaft to apply a shearing force to a material to be kneaded by passing the material to be kneaded through a clearance between the kneading wings and an inner surface of the casing. The kneading wings include: long wings extending from a first end side of a rotor axial direction; and short wings extending from a second end side of the rotor axial direction. Each of the long wings is disposed in a range longer than half of a length of a range, in the rotor axial direction, in which the kneading wings are disposed, and each of the long wings is twisted in a direction of flowing the material to be kneaded toward the second end side of the rotor axial direction when the rotor shaft rotates. Each of the short wings is disposed in a range shorter than half of the length of the range, in the rotor axial direction, in which the kneading wings are disposed, and each of the short wings is twisted in a direction of flowing the material to be kneaded toward the first end side of the rotor axial direction when the rotor shaft rotates. A twist angle of each of the long wings is between 38 degrees and 53 degrees inclusive. Each of the long wings includes, between each of the long wings and the inner surface of the casing, a wing top configured to form, along a wing longitudinal direction, a first tip clearance, and a second tip clearance narrower than the first tip clearance in width. A central angle around a rotor axis defining a width of the wing top forming the second tip clearance is between 5 degrees and 10 degrees inclusive.

Since the twist angle of the long wing is between 38 degrees and 53 degrees inclusive in the kneading rotor, the kneading performance of the material to be kneaded can be improved. The wing top of the long wing is formed such that at least two stages of tip clearances with different widths appear along the wing longitudinal direction, and the central angle of the wing top of the long wing that causes the smaller second tip clearance to appear is between 5 degrees and 10 degrees inclusive. Therefore, the productivity of the kneaded product can be increased.

(2) The twist angle of each of the long wings may be between 40 degrees and 50 degrees inclusive.

(3) Each of the long wings may have two stages of different heights in the wing longitudinal direction.

(4) Each of the short wings may have a constant height along the wing longitudinal direction.

(5) The short wings may have heights different from each other.

(6) In the above embodiment, a batch-type kneading apparatus includes: a casing; and the kneading rotor disposed in the casing.

(7) A ratio of the first tip clearance to an inner diameter of the casing may be in a range of 0.02 to 0.07.

(8) Each of the long wings may be formed to make the second tip clearance 3.2 mm or more.

(9) The kneading rotor may include one pair of left and right rotors.

The invention claimed is:

1. A kneading rotor rotatably disposed in a casing of a batch-type kneading apparatus, the kneading rotor comprising:
a rotor shaft; and
kneading wings configured to rotate integrally with the rotor shaft to apply a shearing force to a material to be kneaded by passing the material to be kneaded through a clearance between the kneading wings and an inner surface of the casing,
wherein the kneading wings include:
long wings extending from a first end side of a rotor axial direction; and
short wings extending from a second end side of the rotor axial direction,
each of the long wings is disposed in a range longer than half of a length of a range, in the rotor axial direction, in which the kneading wings are disposed, and each of the long wings is twisted in a direction of flowing the material to be kneaded toward the second end side of the rotor axial direction when the rotor shaft rotates,
each of the short wings is disposed in a range shorter than half of the length of the range, in the rotor axial direction, in which the kneading wings are disposed, and each of the short wings is twisted in a direction of flowing the material to be kneaded toward the first end side of the rotor axial direction when the rotor shaft rotates,
a twist angle of each of the long wings is between 38 degrees and 53 degrees inclusive,
each of the long wings includes, between each of the long wings and the inner surface of the casing, a wing top configured to form, along a wing longitudinal direction, a first tip clearance, and a second tip clearance narrower than the first tip clearance in width, and
a central angle around a rotor axis defining a width of the wing top forming the second tip clearance is between 5 degrees and 10 degrees inclusive.

2. The kneading rotor according to claim 1, wherein the twist angle of each of the long wings is between 40 degrees and 50 degrees inclusive.

3. The kneading rotor according to claim 1, wherein each of the long wings has two stages of different heights in the wing longitudinal direction.

4. The kneading rotor according to claim 1, wherein each of the short wings has a constant height along the wing longitudinal direction.

5. The kneading rotor according to claim 1, wherein the short wings have heights different from each other.

6. A batch-type kneading apparatus comprising:
a casing; and
the kneading rotor according to claim 1, the kneading rotor being disposed in the casing.

7. The batch-type kneading apparatus according to claim 6, wherein
a ratio of the first tip clearance to an inner diameter of the casing is in a range of 0.02 to 0.07.

8. The batch-type kneading apparatus according to claim 6, wherein
each of the long wings is formed to make the second tip clearance 3.2 mm or more.

9. The batch-type kneading apparatus according to claim 6, wherein
the kneading rotor includes one pair of left and right rotors.

* * * * *